No. 687,779. Patented Dec. 3, 1901.
F. H. PIERPONT.
STAMPING OR PUNCHING MACHINE.
(Application filed June 5, 1901.)

(No Model.) 12 Sheets—Sheet 1.

No. 687,779.  
F. H. PIERPONT.  
STAMPING OR PUNCHING MACHINE.  
(Application filed June 5, 1901.)  
Patented Dec. 3, 1901.

(No Model.)

Witnesses:  
J. M. Fowler Jr.  
Thomas Durant.

Inventor  
Frank H. Pierpont  
by  
his Attys.

No. 687,779. Patented Dec. 3, 1901.
F. H. PIERPONT.
STAMPING OR PUNCHING MACHINE.
(Application filed June 5, 1901.)
(No Model.) 12 Sheets—Sheet 5.

No. 687,779.  
F. H. PIERPONT.  
STAMPING OR PUNCHING MACHINE.  
(Application filed June 5, 1901.)  
Patented Dec. 3, 1901.

(No Model.) 12 Sheets—Sheet 8.

No. 687,779. Patented Dec. 3, 1901.
F. H. PIERPONT.
STAMPING OR PUNCHING MACHINE.
(Application filed June 5, 1901.)
(No Model.) 12 Sheets—Sheet 9.

No. 687,779. Patented Dec. 3, 1901.
F. H. PIERPONT.
STAMPING OR PUNCHING MACHINE.
(Application filed June 5, 1901.)

(No Model.) 12 Sheets—Sheet 10.

No. 687,779. Patented Dec. 3, 1901.
F. H. PIERPONT.
STAMPING OR PUNCHING MACHINE.
(Application filed June 5, 1901.)

(No Model.) 12 Sheets—Sheet 11.

No. 687,779. Patented Dec. 3, 1901.
F. H. PIERPONT.
STAMPING OR PUNCHING MACHINE.
(Application filed June 5, 1901.)

(No Model.) 12 Sheets—Sheet 12.

UNITED STATES PATENT OFFICE.

FRANK HINMAN PIERPONT, OF HORLEY, ENGLAND, ASSIGNOR TO LANSTON MONOTYPE MACHINE COMPANY, OF WASHINGTON, DISTRICT OF COLUMBIA, A CORPORATION OF VIRGINIA.

STAMPING OR PUNCHING MACHINE.

SPECIFICATION forming part of Letters Patent No. 687,779, dated December 3, 1901.

Application filed June 5, 1901. Serial No. 63,280. (No model.)

*To all whom it may concern:*

Be it known that I, FRANK HINMAN PIERPONT, a citizen of the United States, residing at Horley, in the county of Surrey, England, have invented certain new and useful Improvements in or Relating to Stamping or Punching Machinery; and I do hereby declare the following to be a full, clear, and exact description of the same, reference being had to the accompanying drawings, forming a part of this specification, and to the letters of reference marked thereon.

This invention relates generally to stamping or punching machinery, but specifically to a machine for producing matrices such as are used in type casting and setting machines of the Lanston monotype order.

The object of the invention is to provide a machine which at each revolution shall produce from a metal blank a matrix of definite dimensions with its character properly justified as to alinement, side spaces, and flatness of face, with the axis of its locating cone-hole exactly coincident with the longitudinal axis of the matrix and with the material of which the matrix is composed compressed, so as to render it dense and hard.

In the accompanying drawings.

Like letters indicate like parts in all the figures.

Figure 1:
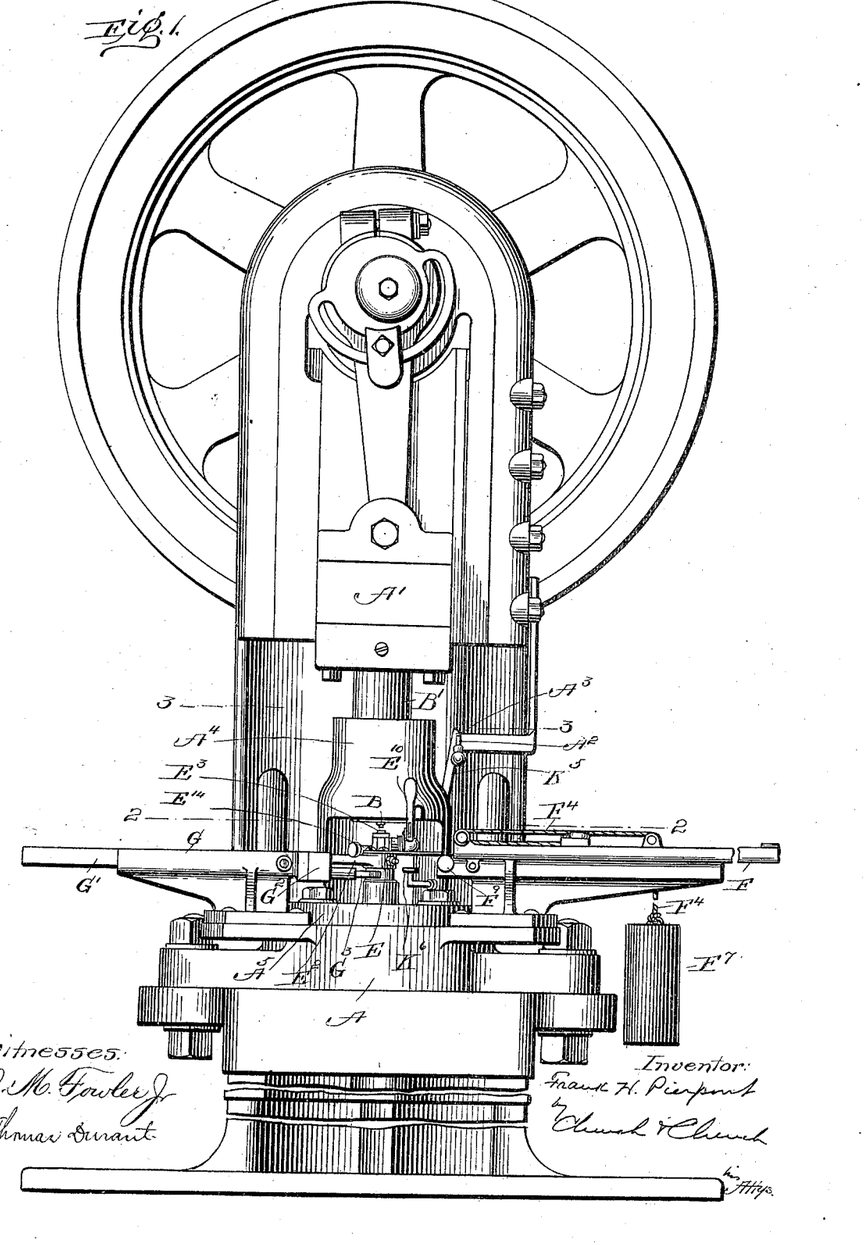
Figure 1 is a front view of the complete machine, the die-holder being in its raised position and the transferrer in its first position—that is, with its blank-holder over the stamping-chamber and its matrix-holder in line with the delivery-race.

The machine is carried on a standard, as shown in Fig. 1, and has a main frame A, on the upper part of which is carried a reciprocating stamp A', in which the die-holder B' is fixed. The mechanism for reciprocating the stamp forms no part of this invention and need not therefore be particularly described in this specification. It may be of any usual or approved construction, and in the example illustrated its movements are controlled by a tripping-lever $A^2$, the raising of which allows the stamp to make one revolution, the lever being caught and held at the end of each revolution by a safety-catch $A^3$.

The catch $A^3$ is formed on the end of a vertical extension of an arm $K^5$, fixed on one end of a rocking shaft K, Figs. 1, 2, 3, and 4, which is carried in a sleeve K', fixed on the machine-frame. The other end of the rock-shaft is also provided with a horizontal arm having a vertical extension ending in a cap $K^6$. This cap is adapted to be depressed by means hereinafter described, so as to rock the shaft K and withdraw the catch from lever $A^2$. A spring $K^2$ is provided, which normally holds the catch in engagement with the lever, and the head of the catch is inclined or curved, Fig. 1, so that as the lever descends it presses back the catch and is automatically engaged by the same. A stud $K^4$ on the arm $K^5$ may be provided, engaged in a slot in a bracket $K^3$ (fixed on the machine-frame) to limit the movement of the catch under the pressure of the spring.

Figure 5:
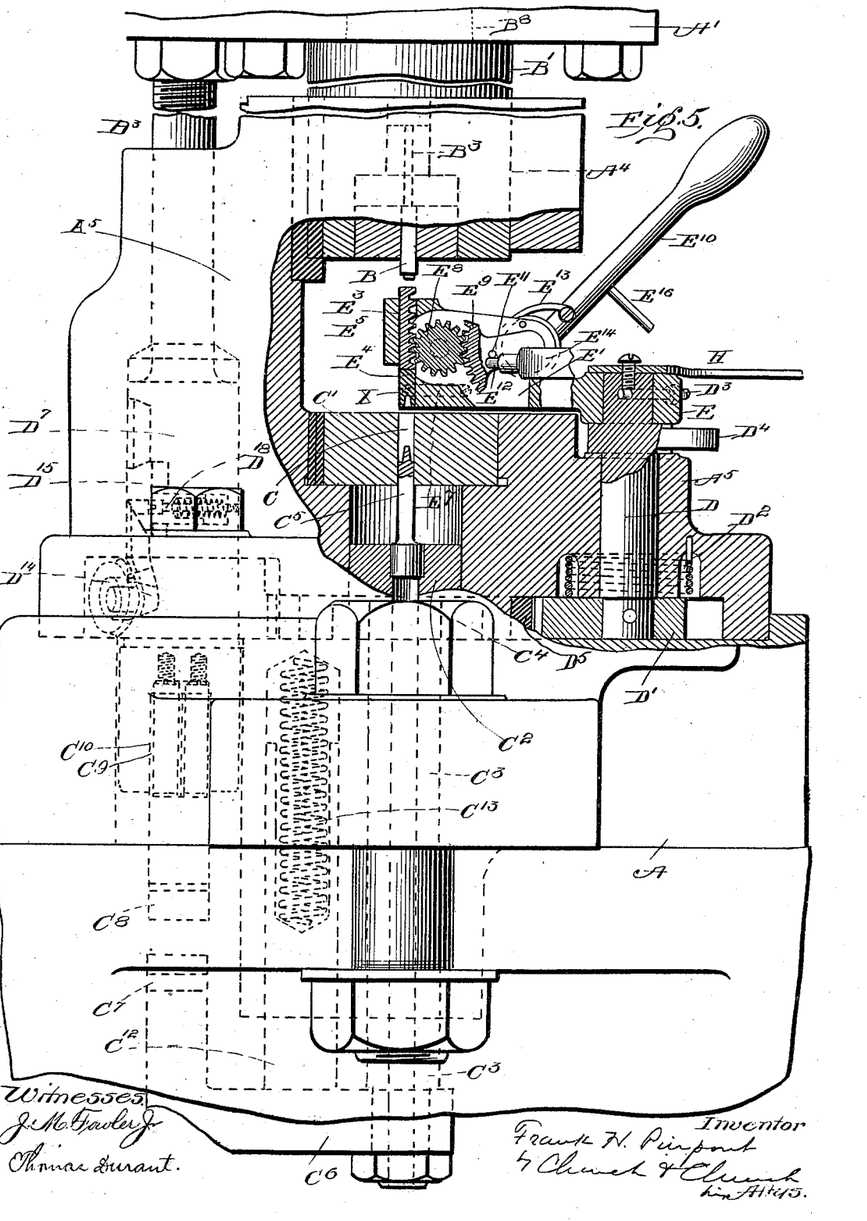
Fig. 5 is a side elevation, partly in section, of the central part of the machine, showing the stamping-chamber transferrer and its operative mechanism.
Figure 6:
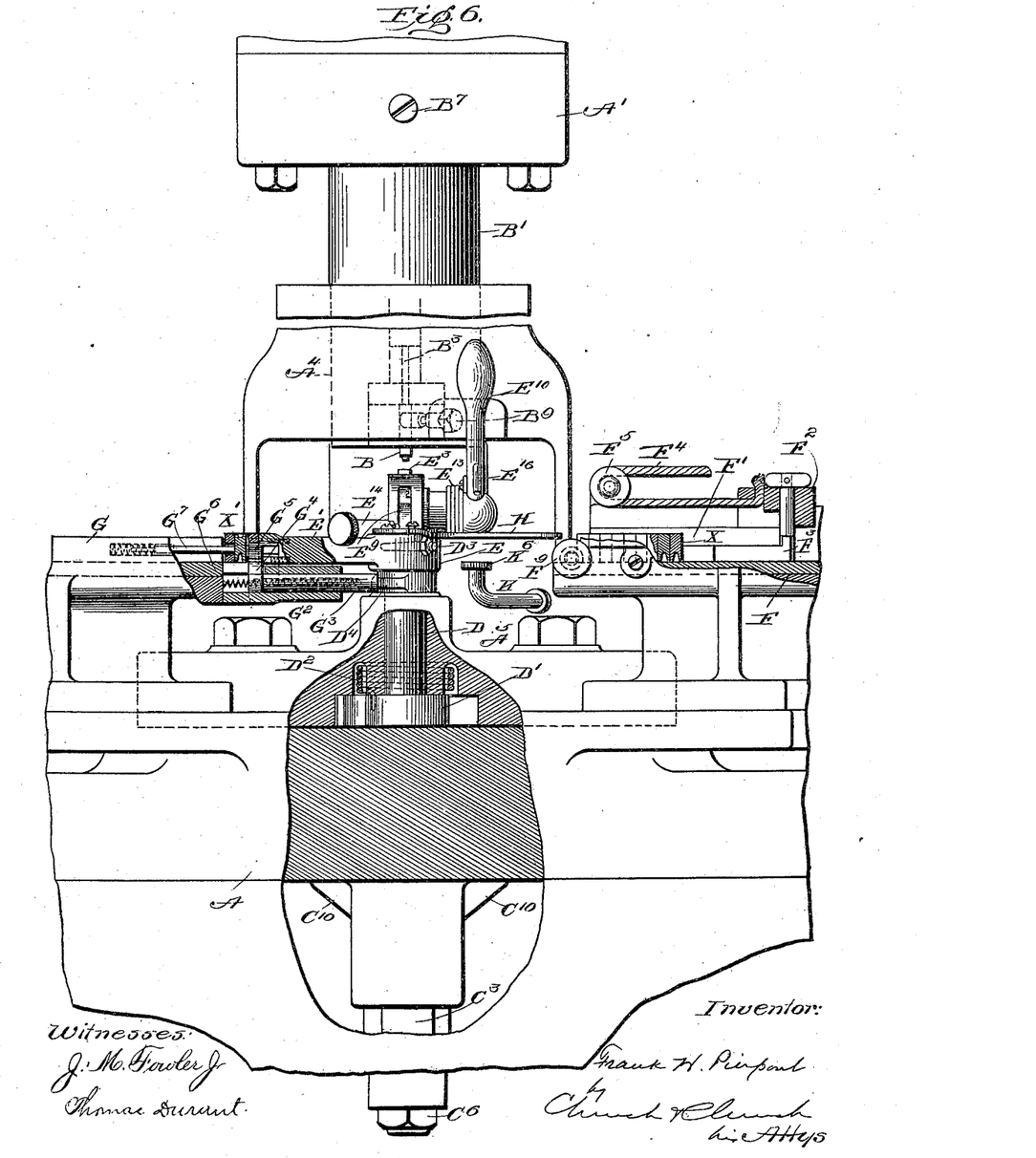
Fig. 6 is a similar front elevation.
Figure 7:
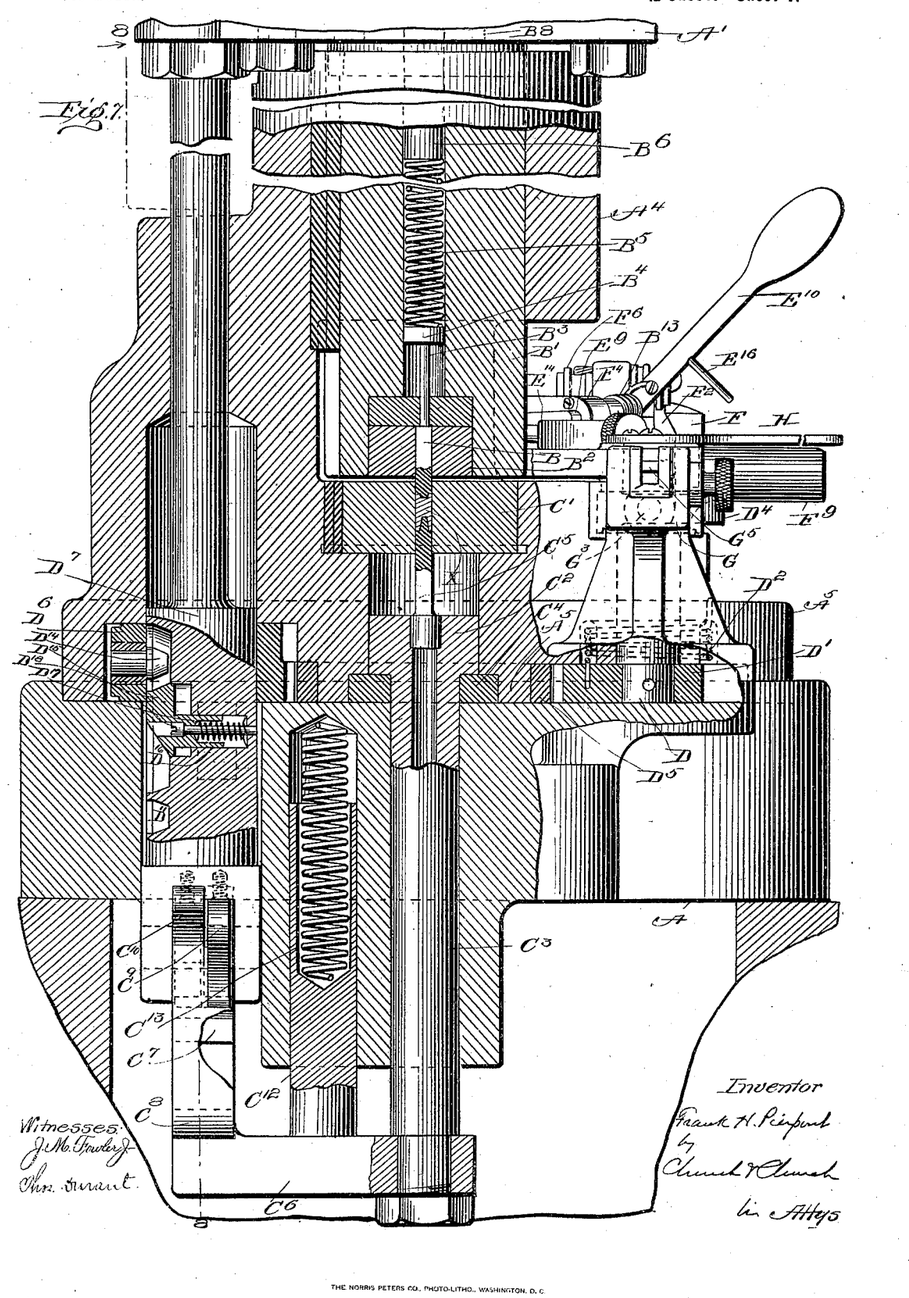
Fig. 7 is a side elevation similar to Fig. 5, but showing the parts in different operative position.

The die B, Figs. 5, 6, and 7, is held in a die-holder B', which reciprocates in a guideway $A^4$ in the upper portion of a block $A^5$, bolted on the main frame, and beneath the die B is the stamping-chamber C, the exact size in cross-section of the matrix when stamped, said chamber being formed in a hardened-steel block $C'$, preferably cylindrical, let into the lower portion of the frame-block $A^5$. The frame-block is bored out beneath the stamping-chamber to receive the enlarged head $C^2$ of a movable rod $C^3$, which extends down through the frame, Fig. 7. The head $C^2$ rests on a hardened-steel ring $C^4$ and has inserted in it the base of a conical-headed punch $C^5$, which forms the floor of the stamping-chamber and also acts as an ejector for the matrix after being stamped, the rod $C^3$ being reciprocated for this purpose, as hereinafter described. The rod $C^3$ is also preferably bored out centrally to enable the punch $C^5$ to be readily removed from the head $C^2$ should it become necessary to change the same.

Figure 10:
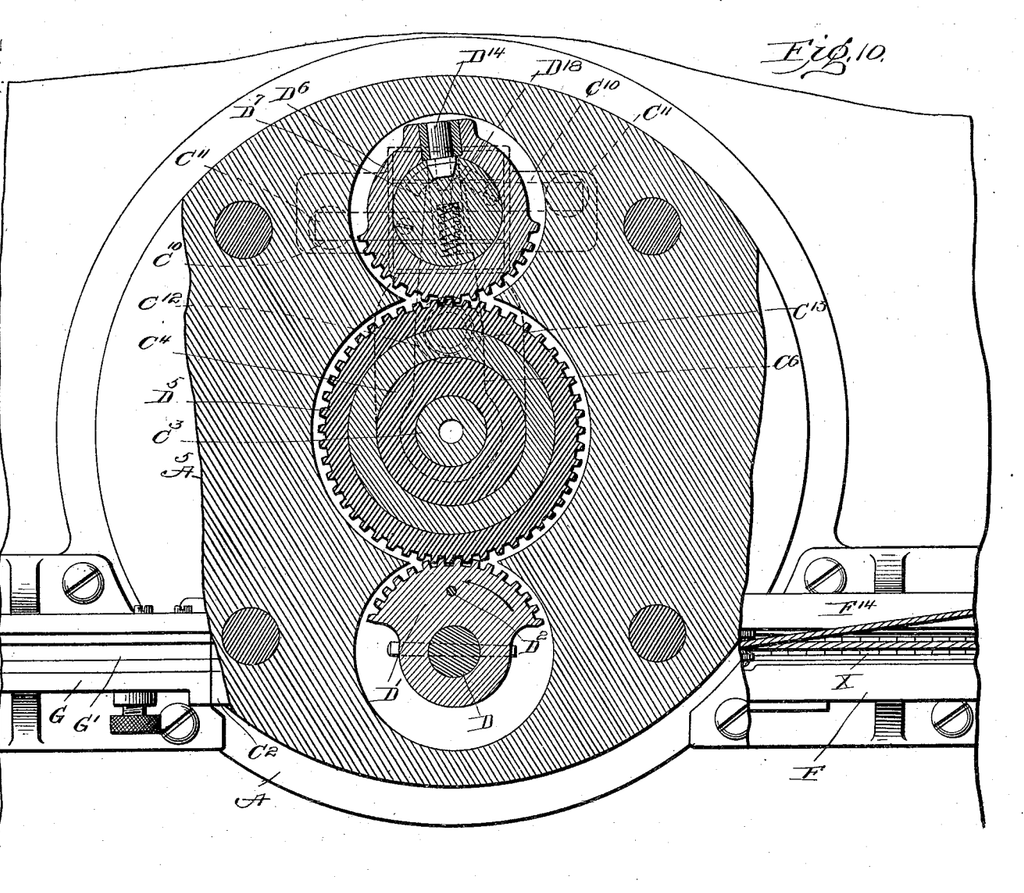
Fig. 10 is a sectional detail showing the transferrer's operative gear.

In front of the stamping-chamber C and carried as a working fit in the block $A^5$ is a pin D, onto the bottom of which is pinned a toothed segment $D'$, Figs. 5 and 10. Attached to this segment $D'$ is one end of a coiled spring $D^2$, carried in a recess in the block $A^5$ above the segment and so arranged that it tends to move the segment in the direction of the arrow marked on the segment in Fig. 10.

Fixed onto the top of the pin D, preferably by means of a taper pin $D^3$, is a member, which we call the "transferrer," comprising a body E and two arms $E'$ and $E^2$, extending from the body at right angles to each other and in which are placed the blank-holder and the matrix-holder, respectively.

Figure 12:
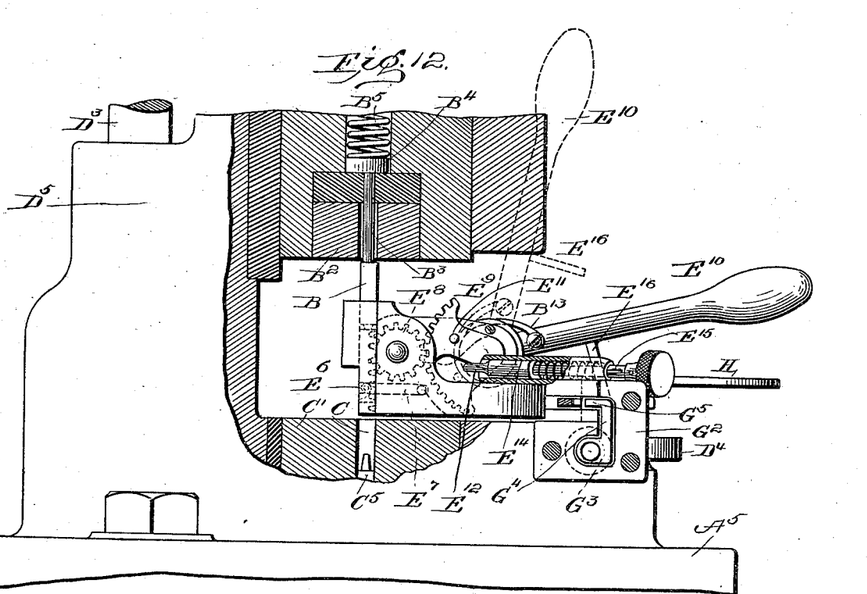
Fig. 12 is a side view, partly in section and partly in elevation, showing the die-holder and the transferrer to illustrate the method of placing a new die in the holder.
Figure 13:
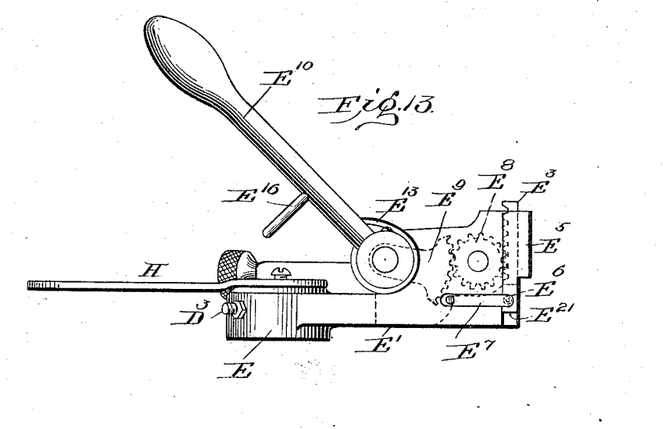
Figs. 13 and 14 are side elevations of the transferrer detached, showing the blank and matrix holders, respectively.

One side of the arm $E'$ is seen in full elevation in Fig. 12 and partly broken away in Fig. 5. Fig. 13 is an elevation showing the other side. The arm is best seen in plan in Figs. 2 and 4.

In the free end of the arm $E'$ is a vertical rectangular hole of the same cross-section as a matrix-blank, of which the upper portion is occupied by a toothed rack $E^3$. At the lower portion the end wall of the arm is cut away, leaving a three-walled chamber or blank-holder $E^4$, open in front and at the bottom and with a projecting portion $E^5$ of the arm above it, Fig. 5. A stud $E^6$, Figs. 2, 12, and 13, under pressure of a spring $E^7$, protrudes slightly through one wall of the holder, Fig. 4, with force sufficient to hold a matrix-blank from falling out when placed within the holder, and for a purpose hereinafter described a portion of the wall below the stud is cut away, as shown in Fig. 13.

Behind the rack-chamber the arm $E'$ is slotted and partly cut away to receive a gear-wheel $E^8$, engaging with the teeth of the rack $E^3$ and with a toothed segment $E^9$, the latter pivoted in the wall of the arm and provided with a handle $E^{10}$. On one side of the segment $E^9$ is a pin $E^{11}$, which normally engages a spring-controlled pin $E^{12}$, being held against the same by a coiled spring $E^{13}$, one end of which is attached to the handle $E^{10}$, the other to the wall of the blank-holder arm. The rack $E^3$ and the handle $E^{10}$ are thus normally held in the positions shown in Fig. 5, in which the lower end of the rack is in contact with the top of the matrix-blank in the blank-holder. Depressing the handle $E^{10}$ forces the blank out of the holder into the stamping-chamber C.

The handle $E^{10}$ is provided with a pin $E^{16}$, which when the transferrer is in the normal or first position engages on the depression of the handle with the cap $K^6$, before described, depressing the same and rocking the shaft K, so as to liberate the tripping-lever $A^2$ from the safety-catch.

Figure 4:
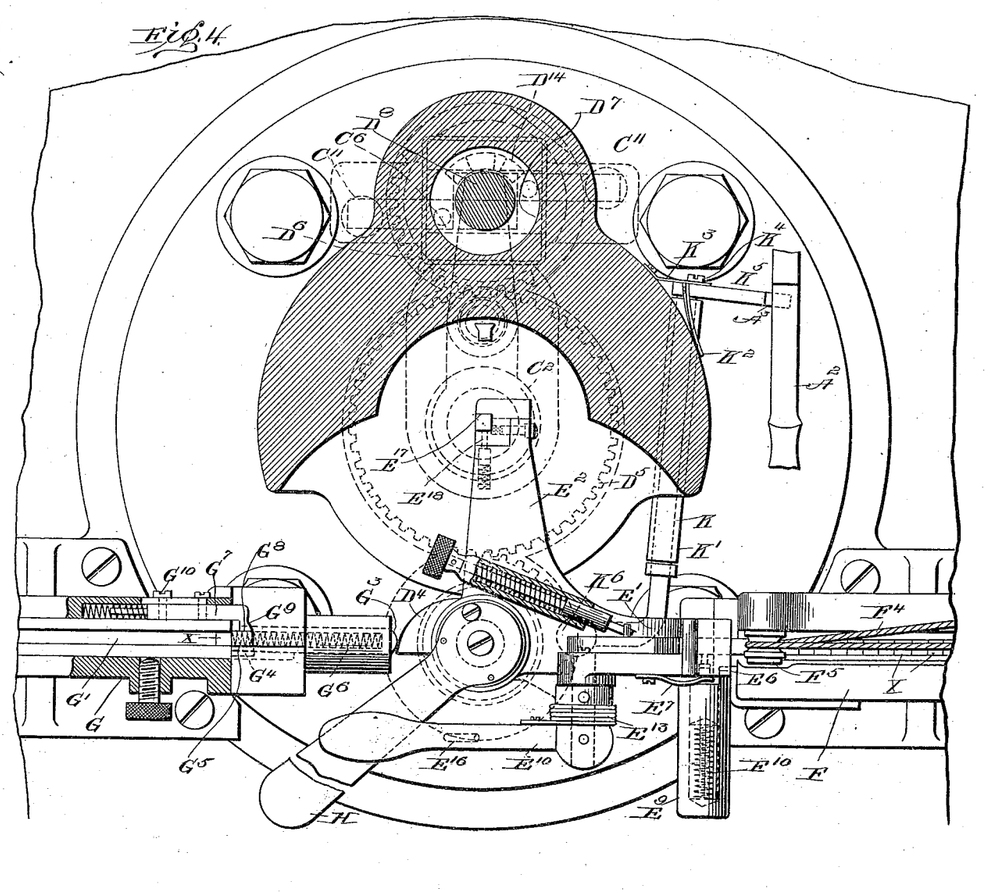
Fig. 4 is a similar section to Fig. 2, but showing the transferrer in its third position—that is, with the blank-holder in position to receive a blank from the feed-race and the matrix-holder over the stamping-chamber.

The pin $E^{12}$ is carried in a casing $E^{14}$, fixed partly on the arm $E'$ and partly on the body E, and is normally held in the forward position, as shown in Figs. 4 and 5, by a spring, but is provided near its head with an offset or key $E^{15}$, which retains it in a position free of the pin $E^{11}$ when drawn back and partly revolved, as shown in Fig. 12.

Figure 2:
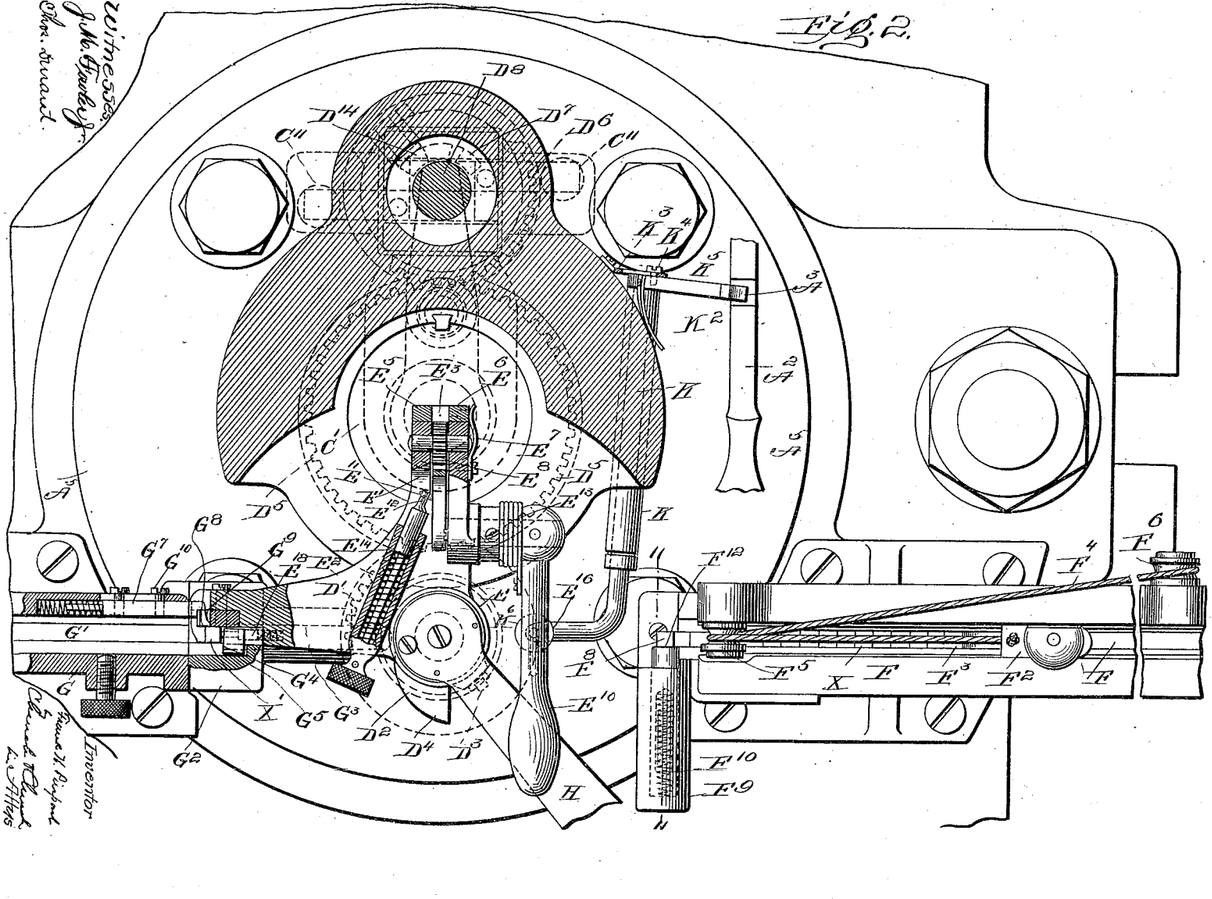
Fig. 2 is a section on the line 2 2 of Fig. 1.
Figure 11:
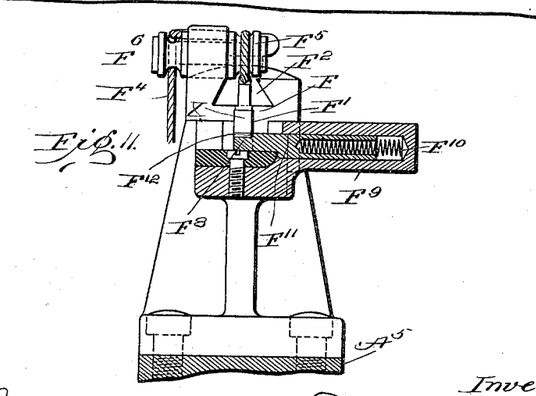
Fig. 11 is a section on the line 11 11 of Fig. 2, showing the feed-galley and its catch.

Fixed onto the right-hand side of the machine-frame is a feeding-race F. (Shown in plan in Figs. 2 and 4, in side view, partly broken away, in Fig. 6, and in end view in Fig. 11.) It consists of a channel $F'$, in which the blanks are held as an easy fit in a vertical position. The walls of the race are continued upward above the matrices to form a dovetailed guide in which works a slide $F^2$, with which is connected a pushing-block $F^3$, the end of which engages the hindmost of the blanks in the channel. The slide $F^2$ is provided with a cord $F^4$, carried over guiding-wheels $F^5 F^6$ and having a weight $F^7$ suspended to its end, so as to pull it with steady pressure toward the inner end of the channel and drive the blanks out of the same. This is prevented by a stop $F^8$, Figs. 2 and 11, forming the end of a pin $F^{11}$, movably carried in a guide $F^9$ and normally held in front of the race-channel by the pressure of a spring $F^{10}$. As shown in Figs. 2 and 11, the stop is smaller than its pin, forming on it a shoulder $F^{12}$.

The feed-race F is so placed relatively to the transferrer that when the latter is placed in the position shown in Fig. 4 the blank-holder $E^4$ of its arm $E'$ is brought directly opposite the end of the channel $F'$, and in swinging around into that position its wall has engaged the shoulder $F^{12}$ and forced the stop $F^8$ against the pressure of its spring away from the front of the channel, so that the last blank in the channel is driven into the holder. It will be remembered that the bottom of the wall of the holder is cut away, as shown at $E^{21}$, Fig. 13, so as not to engage the stop $F^8$ itself, which therefore directly follows up the blank in the holder when the transferrer is returning to its normal position and is again placed in front of the last blank in the channel before the transferred blank has been removed entirely from in front of it.

When the transferrer is in the position shown in Fig. 4—that is, with the blank-holder in the end of the arm E' opposite the feed-channel—the other arm E² has its matrix-holder directly over the stamping-chamber, and when the transferrer is in normal position, as shown in Fig. 2, the matrix-holder is in line with a channel G' of a delivery-race G.

Secured onto the end of the delivery-race G is a block G², Fig. 6, bored out longitudinally to receive a movable pin G³, fixed onto which or formed integral therewith is a pusher G⁴, (seen in end view in Fig. 12,) engaged in a slot in the block and of which the head G⁵ lies in a recess of the same, which recess forms a continuation of the race-channel G'. The position of the pusher-head G⁵ in the slot (see Figs. 5 and 6) is determined by a cam D⁴, formed on or fixed to the pin D, on which the transferrer is carried, the movable pusher-pin G³ being held in contact with the cam-curve by a spring G⁶.

Figure 3:
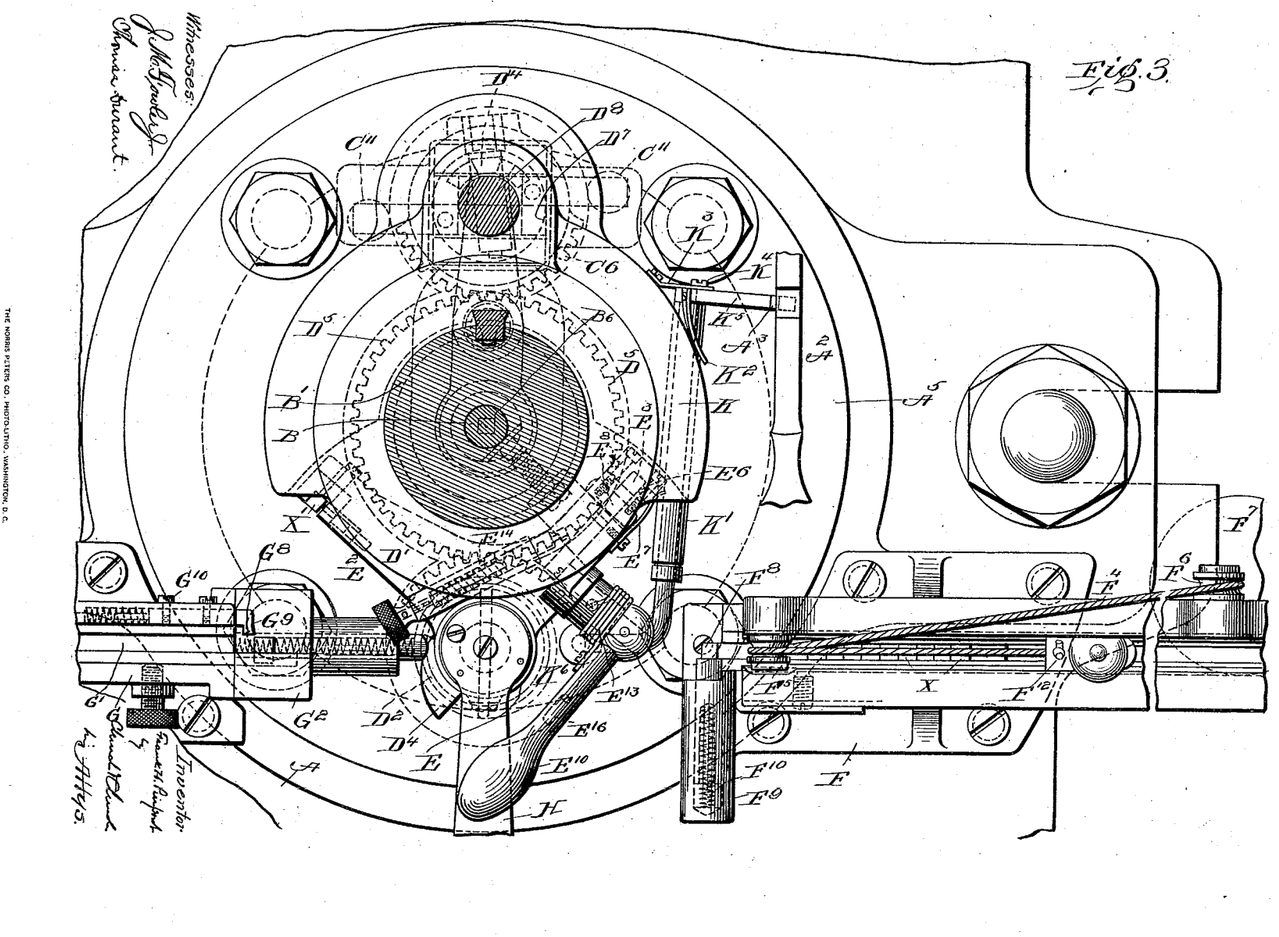
Fig. 3 is a section on the line 3 3 of Fig. 1, but with the die-holder in its lowered position and the transferrer in its second or inoperative position.

A spring-controlled catch G⁷ is carried in a slot in one of the side walls of the race G. The front surface G⁸ of the catch-head corresponds with one of the walls of the race-channel G', and a beveled surface G⁹ is provided on its end. Normally the head is held in its most forward position, determined by a set-screw G¹⁰, as shown in Figs. 2 and 3.

Figure 14:
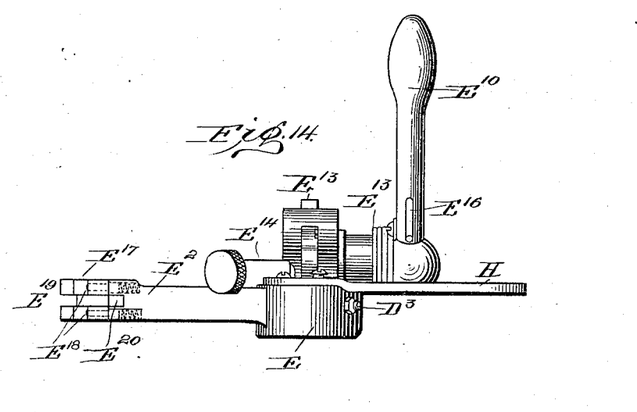

The matrix-holder, Fig. 14, is a vertical slot E¹⁷, formed in one side of the transferrer-arm E². Preferably for constructional purposes it is formed in a block separate from the arm E² and fixed thereto by screws, as shown clearly in Fig. 4. The matrix is held in the holder by one or two studs E¹⁸, which protrude slightly into the holder under spring-pressure. The end of the arm E² has a slot E¹⁹, Fig. 14, cut deep enough to remove part of the outer side wall of the matrix-holder. This slot receives the head of the catch G⁷. A second slot E²⁰ starts from the inner side wall of the holder. This slot receives the matrix pusher-head G⁵.

The transferrer, with the pin D, is arranged to oscillate and to be arrested in three fixed positions. The normal or first position is shown in Fig. 2 when the machine is at rest, the die B at the top of its stroke, the blank-holder over the stamping-chamber, and the matrix-holder in line with the delivery-race. The second position is shown in Fig. 3. This position is assumed during the beginning of the downstroke of the die and maintained until shortly after the commencement of the upstroke. In this position both arms of the transferrer are removed from under the die. The third position is shown in Fig. 4. It is assumed about the middle of the upstroke, by which time the die is raised sufficiently to allow of the transferrer-arm E² passing beneath it. In this position the blank-holder is in line with the feed-race and the matrix-holder is over the stamping-chamber. It is maintained until the die reaches the top of its stroke, when the transferrer flies back to the normal or first position.

The mechanism for oscillating the transferrer is operated by the stamp A', in which the die-holder is fixed, and is shown in Figs. 5, 7, 8, 9, and 10.

Figure 8:
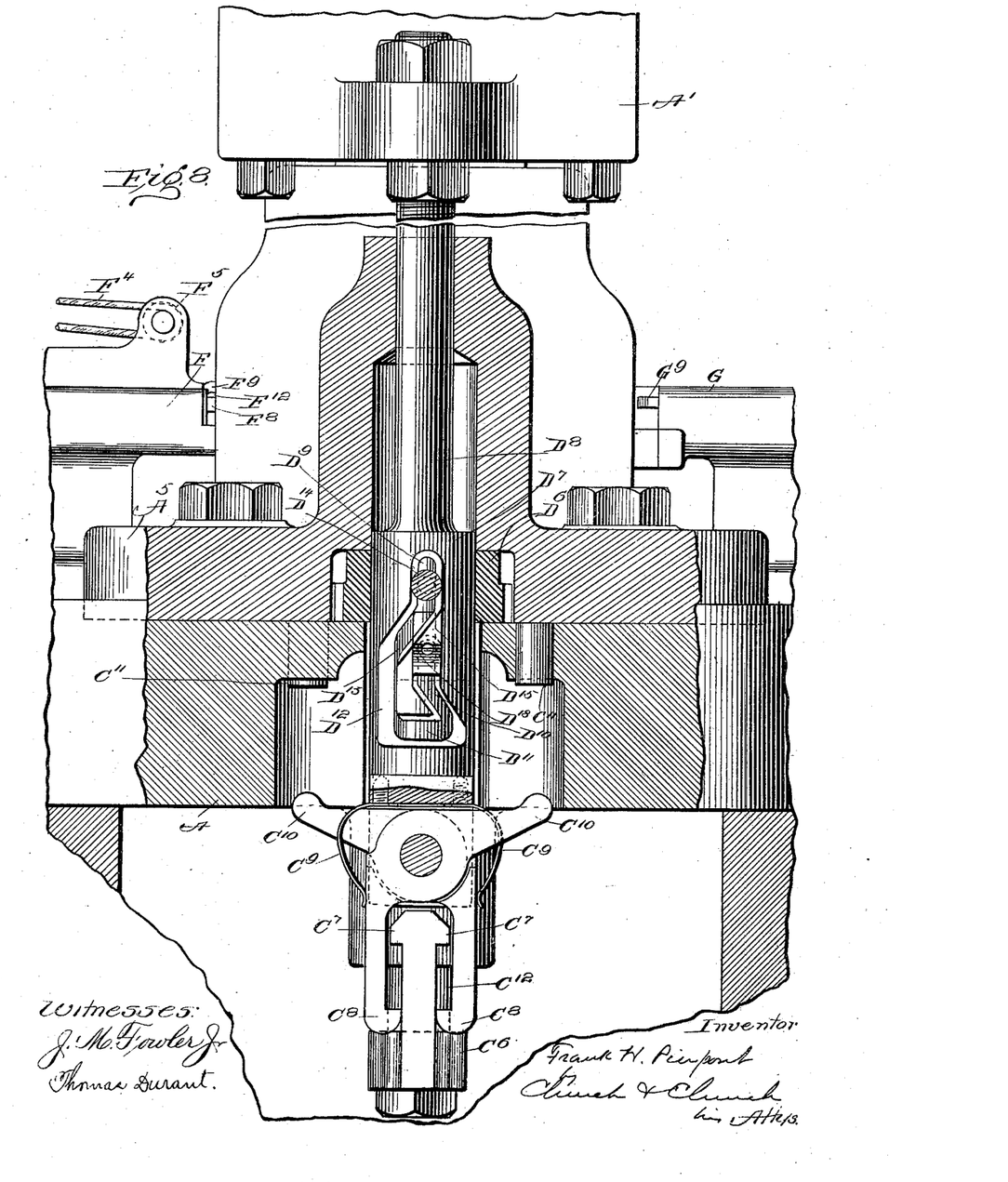
Fig. 8 is a section on the line 8 8 of Fig. 7.
Figure 9:
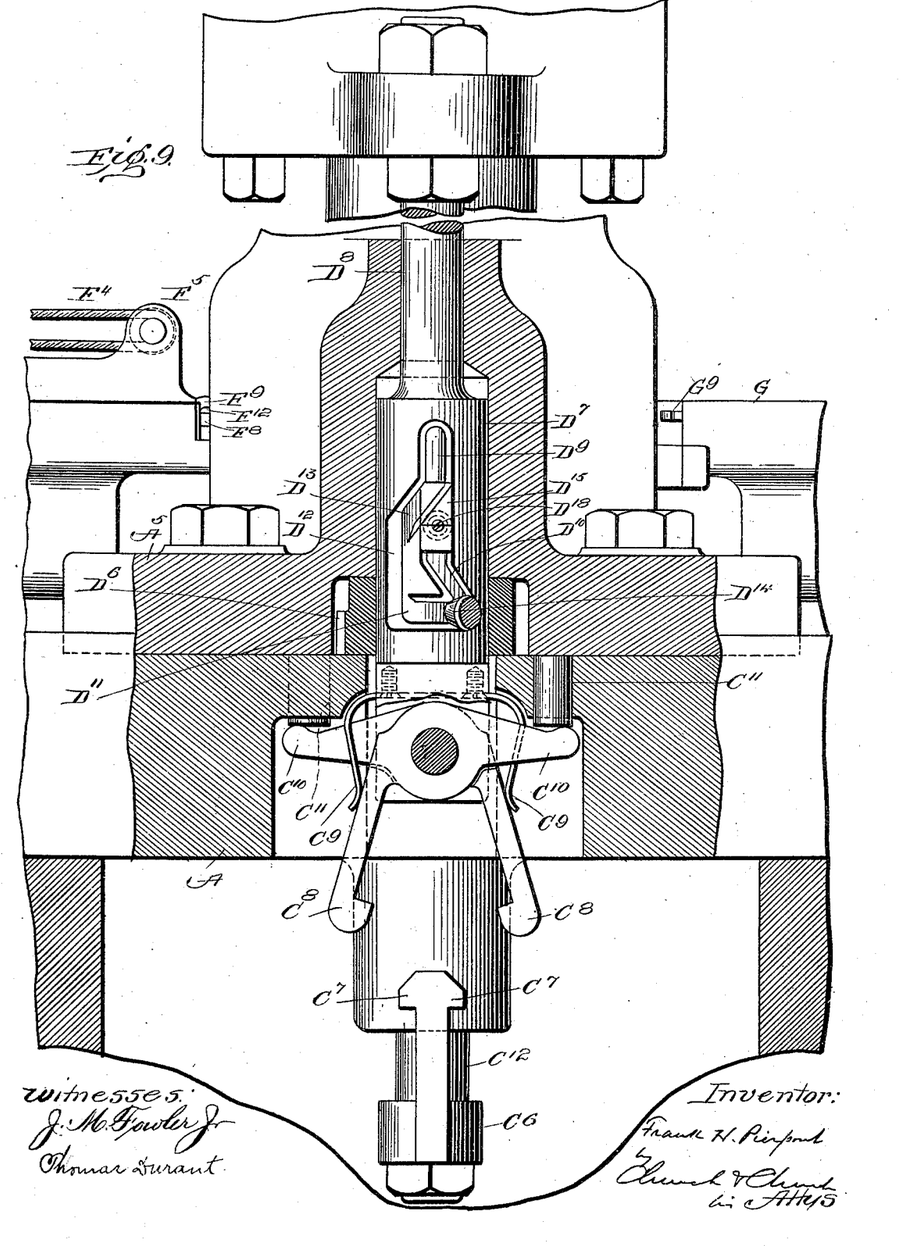
Fig. 9 is a similar section, but showing the parts in different operative positions.

It will be remembered that on the bottom of the pin D is fixed a toothed segment D', Fig. 10. This segment engages a toothed ring D⁵, free to revolve in a recess in the bottom of the block A⁵, and this ring engages with the teeth of a second segment D⁶, movably carried on the enlarged end D⁷ of a rod D⁸, which works in a guiding-chamber in the block A⁵ and has its upper end secured onto the stamp A', so as to reciprocate with the die and its holder. Formed in the enlarged portion D⁷ of the rod D⁸ is a cam-groove. (Best seen in Fig. 8.) Looking at this figure it is seen that the cam has a vertical portion D⁹, ending in an oblique portion D¹⁰, a horizontal portion D¹¹, forming the bottom of the cam, continued upward by a vertical portion D¹², which joins the vertical portion D⁹ by an oblique portion D¹³. Fixed in the back of the segment D⁶ is a pin having a conical head D¹⁴, which engages in the cam-groove. A shunt-block D¹⁵ is placed in the vertical groove D⁹ where the oblique groove D¹³ branches off to direct the pin D¹⁴ into the oblique groove when descending from the top of the vertical groove. This shunt is best seen in Fig. 7 and consists of a block D¹⁵, carried on a hollow arm D¹⁶, sliding in a guiding-recess and controlled by a spring D¹⁷ and pin D¹⁸, so as to be normally protruded into the cam-groove. The lower surface of the block is beveled and the upper surface shaped to receive direct vertical pressure from the descending pin. The pin and cam are so arranged that at the commencement of a downstroke of the die, and consequently of the rod D⁸, the pin D¹⁴ is in the right-hand corner of the horizontal groove D¹¹, as shown in Fig. 9, and the transferrer is in normal position, as shown in Fig. 5. As the rod descends the pin enters the oblique groove D¹⁰, turning the segment and wheel-gear into the position shown in Fig. 10 and rotating the pin D, thereby placing the transferrer in the second position. As the rod descends farther the pin meets the beveled surface of the shunt, pushes this back into the recess, and passes to the top of the vertical groove, as shown in Figs. 7 and 8. As the rod ascends the pin is directed by the upper surface of the shunt-block into the oblique portion D¹³ of the cam-groove and the transferrer is moved into its third position, in which it continues until the pin has reached the bottom of the shorter vertical groove D¹². The two oblique movements of the cam above described have been in opposition to the tension of the spring D², which, it will be remembered, tends to pull the segment D' in the direction of the arrow in Fig.

10. Directly therefore the pin enters the left hand of the horizontal groove the spring, being now free to act, revolves the segmental gear and returns the transferrer to the first or normal position.

It will be remembered that the conical punch $C^5$, carried on the rod $C^3$, forms the floor of the stamping-chamber and also acts as the matrix-ejector therefrom. It is reciprocated for this purpose by the following mechanism, (shown in Figs. 7, 8, and 9:) On the end of the rod $C^3$ is fixed a backwardly-extending bar $C^6$, ending in a vertical arm having two offsets $C^7$, adapted to engage a pair of gripping-hooks $C^8$, pivoted onto the lower end of the rod $D^8$. The hooks are normally held closed by springs $C^9$, but are each provided with an arm $C^{10}$, which engages with a stop $C^{11}$ in the frame and forces them suddenly apart shortly before the die reaches the top of its stroke. A hollow pin $C^{12}$, working in a recess in the frame under the control of a coiled spring $C^{13}$, returns and holds the rod $C^3$ and with it the punch $C^5$ in their lowest position, directly the gripping-hooks are opened. The gripping-hooks $C^8$ are adapted to engage the offsets $C^7$ synchronously with the matrix-holder of the transferrer being placed over the stamping-chamber and to release the same directly the matrix has been placed within the holder.

A handle H is fixed—say by a screw H'—onto the head of the transferrer carrying pin D.

The operation of the machine is as follows: The channel F' of the feed-race is filled with blanks X, in each of which the locating cone-hole has already been approximately formed. The machine is in its normal position, the die being at the top of its stroke and the transferrer with its blank-holder over the stamping-chamber, Fig. 2. It will be remembered that in this position the pin $D^{14}$ of the transferrer-oscillating gear is at one end of the horizontal portion $D^{11}$ of the cam-slot and held there by tension of the spring $D^2$. The operator, therefore, by pulling the handle H toward the left, Fig. 2, can bring the transferrer into the third position, Fig. 4. The blank-holder receives a blank from the race, and on the operator releasing the handle H the spring $D^2$ returns the transferrer to the first position, Figs. 2, 5, 6, and 9. The handle $E^{10}$ is now depressed. The rack $E^3$ drives the blank X from the holder into the stamping-chamber, and at the same time the handle-pin $E^{16}$, rocking the shaft K, releases the tripping-lever, and the die commences its downstroke. The handle $E^{10}$ is immediately released, and the rack and handle return to normal by the action of the spring $E^{13}$. The transferrer gear-pin $D^{14}$ immediately engages the oblique section $D^{10}$ of the cam-slot, and the transferrer is placed in its inoperative position, Fig. 3, so that both arms are clear of the descending die. The die completes its downstroke and enters the stamping-chamber C, stamping the blank. The body of the die B is shaped in cross-section so as to form a working fit in the stamping-chamber C and projects beyond its holder, so that a portion of its body is within the stamping-chamber, as shown in Fig. 7, during the operation of stamping. The blank is thus entirely surrounded by retaining and compressing walls during the whole of the stamping operation. The die now commences to ascend, and as soon as it has risen sufficiently to clear the transferrer-arm $E^2$ the pin $D^{14}$ engaging the oblique section $D^{13}$ of the cam-slot the transferrer is again shifted into its third position, as shown in Fig. 4, and the blank-holder receives a fresh blank from the feed-race, while the matrix-holder is brought over the stamping-chamber. The die completes its upward stroke, and while this is being done, the pin $D^{14}$ being engaged in the vertical section $D^{12}$ of the cam-slot, no movement is given to the transferrer. The gripping-hooks $C^2$, however, which during the downward stroke of the die were brought below the offsets $C^7$, as shown in Fig. 8, now engage these offsets, raising the rod $C^3$ and with it the conical punch $C^5$, driving the matrix X out of the stamping-chamber into the transferrer-holder. Directly this is done and before the die has completed its upward stroke the arms $C^{10}$ of the gripping-hooks engaging the stops $C^{11}$, Fig. 9, the hooks release the offsets $C^7$, and the punch $C^5$ is returned to normal by the action of the spring $C^{13}$. On the die completing its upward stroke the transferrer gear-pin $D^{14}$ enters the horizontal section $D^{11}$ of the cam-slot and the transferrer returns to normal position, placing a fresh blank in position under the die, while the tripping-lever reëngages with the safety-catch. At the same time the matrix-holder is placed in position shown in Fig. 2, placing the matrix X' in line with the delivery-race. In being swung into this position the matrix engages the beveled surface $G^9$ on the end of the spring-catch $G^7$, pushing the catch back. Directly the matrix has passed the catch the latter under its spring-pressure resumes its normal position, so that its front edge $G^8$ is behind the matrix, as best shown in Fig. 2. At the same time the pusher-head $G^5$ has entered the slot $E^{20}$ of the matrix-holder and is therefore in contact with the matrix held therein. When, therefore, at the commencement of a further operation the transferrer-arm $E^2$ is moved away from the delivery-race, the matrix is prevented from moving with it by the spring-catch $G^7$, and at the same time the cam $D^4$, advancing the pusher $G^4$, its head drives the matrix into the delivery-race out of the road of the next matrix.

It is desirable that the matrix-stamping dies should be quickly and readily placed in and removed from the holder. For this purpose the die-holder B' is provided with a block $B^2$, in which the chamber for the die is formed, and this chamber is furnished with an ejecting-rod $B^3$, having an enlarged head $B^4$, which is held in its lowermost position by a spring $B^5$. For convenience of construction the die-holder may be bored throughout its whole length to receive the spring, a rod $B^6$ being placed above it, as shown in Fig. 7. The end $B^8$ of the die-holder $B'$ is fixed in the plunger $A'$ by means of a screw $B^7$.

The blank-holder arm $E'$ of the transferrer is employed to place the die in its chamber. The rack $E^3$ is lowered into the position shown in Fig. 12 and the die B placed above it. The handle $E^{10}$ is then raised into the position shown in dotted lines in Fig. 12, pushing the die into its chamber against the pressure of the spring $B^5$. The die is then secured by the set-screw $B^9$. (Shown in Fig. 6.) To remove the die, it is only necessary to loosen this set-screw, when it is ejected by the spring acting through the rod $B^3$.

To enable the handle $E^{10}$ to be raised, as shown in Fig. 12, it is necessary that the pin $E^{11}$ should pass below the pin $E^{12}$, and it is for this purpose that the latter is provided with the draw-back and holding arrangements previously described.

It is evident that if it be desired to stamp matrices without a locating cone-hole the coned portion of the punch $C^5$ may be dispensed with, its upper surface forming a flat floor to the stamping-chamber.

Having thus described my invention, what I claim as new, and desire to secure by Letters Patent, is—

1. In a matrix-stamping machine such as described, the combination with a die operating in conjunction with a stamping-chamber, of an oscillating member provided with a blank-holder for presenting the blank and a matrix-holder for removing the completed matrix, substantially as described.

2. In a stamping-machine the combination with a reciprocating die, a stamping-chamber, a feed-race and a delivery-race, of an oscillating member which transfers a blank from the feed-race into the stamping-chamber and carries the blank after being stamped to the delivery-race, substantially as described.

3. In a stamping-machine, the combination with a reciprocating die, a stamping-chamber, a feed-race and a delivery-race, of an oscillating member having a blank-holder and a matrix-holder the movements of the member being controlled by a cam moving synchronously with the reciprocating die, substantially as described.

4. In a stamping-machine, the combination with the die and stamping-chamber, of an oscillating member having a blank-holder and a matrix-holder, the member being placed and held in the three specified successive positions during each reciprocation of the stamping-die, substantially as and for the purpose described.

5. In a stamping-machine, the combination with a compression or stamping chamber, a die or plunger reciprocating therein, and an ejector forming the floor of the compression-chamber, of an actuating mechanism for said ejector moving in unison with the plunger and provided with an automatic catch and trip, whereby the ejector is engaged and released during the back stroke of the plunger; substantially as described.

6. In a stamping-machine, and in combination, a stamping-chamber C having fixed side walls, a reciprocating die B which enters and forms the top wall of the chamber, an ejecting-rod which forms the floor of the chamber, and an oscillating member having a blank-holder and a matrix-holder; substantially as described.

7. In a stamping-machine the combination with a stamping-chamber, of an oscillating member having a blank-holder with a spring-controlled stud—such as $E^6$—a rack—such as $E^3$—and mechanism to raise and lower the rack—such as toothed wheel $E^8$ toothed segment $E^9$ and handle $E^{10}$—the mechanism being held in normal position by a spring—such as $E^{13}$—and pin—such as $E^{11}$—engaging a stop; substantially as described.

8. In a stamping-machine, the combination with the laterally-movable blank-holder provided with a discharging member—such as bar $E^3$—and an actuating-lever therefor of a spring-controlled stop-pin provided with a catch for holding it in retracted position; substantially as described.

9. In a stamping-machine the combination with an oscillating member having a blank-holder, of a feed-race with a spring-controlled stop having a shoulder—such as $F^{12}$—adapted to engage the blank-holder, substantially as described.

10. In a stamping-machine the combination with an oscillating member having a matrix-holder, of a delivery-race and a spring-controlled catch having surfaces—such as $G^8$ $G^9$—each adapted to engage the matrix in effecting the removal of the same from the holder; substantially as described.

11. In a stamping-machine the combination with an oscillating member having a matrix-holder provided with a seat—such as slot $E^{20}$—of a delivery-race, and a pusher—such as $G^4$ $G^5$—adapted to engage in the slot, the pusher being actuated by a spring and a cam—such as $D^4$—moving with the oscillating member, substantially as described.

12. In a stamping-machine, the combination with an oscillating blank and matrix-carrier fixed on a pin having a toothed segment and a spring, of an actuating-cam adapted to reciprocate in unison with the stamp-plunger, a pin engaged by the cam and fixed on a toothed segment and a toothed ring engaging both segments; substantially as described.

13. In a stamping-machine, the combination with a stamping-chamber, and an ejector, carried on a rod the latter having an arm—such as $C^6$—with offsets $C^7$, of a rod adapted to reciprocate with the stamp-plunger and having catch-hooks—such as $C^9$ $C^{10}$—which engage the offsets and raise the ejector during a portion of the upward stroke of the plunger, and a spring—such as $C^{13}$—which returns the ejector to normal position when the offsets are released from the catch-hooks; substantially as described.

14. In a stamping-machine, the combination with the plunger, stamping-chamber and ejector, of an automatic blank-transferrer controlled in its movements by the plunger and provided with a blank-holder and a matrix-holder, the one for delivering to and the other for receiving from the stamping-chamber, a blank-ejector for the blank-holder, and means connected with said blank-ejector for actuating the starting-lever for the plunger-operating mechanism; substantially as described.

15. In a stamping-machine and in combination with the starting-lever thereof, a blank-holder provided with means for delivering the blank to the compression or stamping devices and for actuating said starting-lever; substantially as described.

16. In a stamping-machine the combination with the stamping mechanism, including plunger and stamping-chamber, of a feed-race, a blank-holder movable between said feed-race and stamping-chamber, actuating mechanism deriving its movements from the plunger and automatically controlling the motion and position of the blank-holder, a starting device, and a discharging member for the blank-holder with actuating devices therefor controlling said starting device, whereby the placing of the blank inaugurates the motion of the stamping mechanism, recharges the blank-holder and returns the latter to position; substantially as described.

17. In a stamping-machine the combination with a plunger or die and its opposing stamping chamber or member, of a transferrer movable in a path lying intermediate said die and chamber and provided with a blank-holder furnished with a pusher movable longitudinally thereof and adapted to insert the die in its chamber and to deliver a blank to the stamping-chamber as desired; substantially as described.

18. In a blank-transferrer for stamping-machines and the like, the combination with a reciprocating blank-holder provided with blank-retaining devices, of a double-acting pusher for expelling the blank and inserting the die; substantially as described.

19. In a stamping-machine the combination with an open stamping or compression chamber, a plunger opposite said chamber, and a die carried by said plunger, of a transferrer provided with a blank-holder movable laterally of the plunger between the die and the stamping-chamber and provided with a channel parallel with the path of the die, and a pusher movable in said channel to discharge from either end thereof; substantially as described.

20. In a stamping-machine the combination with the die and the stamping-chamber, of a transferrer movable laterally of the die between the latter and the stamping-chamber and provided with a blank or die supporting channel, a pusher movable in said channel for discharging from either end thereof, actuating devices for said pusher, and controlling devices for adjusting the position of the pusher and thereby determining from which end of the channel it shall discharge; substantially as described.

FRANK HINMAN PIERPONT.

Witnesses:
W. J. ROGERS,
R. R. WILSON.